United States Patent
Cavallo et al.

(10) Patent No.: US 6,918,020 B2
(45) Date of Patent: Jul. 12, 2005

(54) CACHE MANAGEMENT

(75) Inventors: Joseph S. Cavallo, Framingham, MA (US); Stephen J. Ippolito, Concord, MA (US)

(73) Assignee: Intel Corporation, Santa Clara, CA (US)

( * ) Notice: Subject to any disclaimer, the term of this patent is extended or adjusted under 35 U.S.C. 154(b) by 351 days.

(21) Appl. No.: 10/232,930

(22) Filed: Aug. 30, 2002

(65) Prior Publication Data

US 2004/0044861 A1 Mar. 4, 2004

(51) Int. Cl.⁷ ............................................. G06F 12/00
(52) U.S. Cl. .................... 711/160; 711/118; 711/133; 711/134; 711/136; 711/154; 711/159
(58) Field of Search ................. 711/118, 133, 711/134, 136, 154, 159, 160

(56) References Cited

U.S. PATENT DOCUMENTS

| | | | |
|---|---|---|---|
| 5,467,460 A | 11/1995 | Patel | |
| 5,572,702 A | 11/1996 | Sarangdhar et al. | |
| 5,895,489 A | 4/1999 | Hammond et al. | |
| 5,905,876 A | 5/1999 | Pawlowski et al. | |
| 5,909,696 A | 6/1999 | Reinhardt et al. | |
| 5,909,699 A | 6/1999 | Sarangdhar et al. | |
| 6,105,111 A | 8/2000 | Hammarlund et al. | |
| 6,151,663 A | 11/2000 | Pawlowski et al. | |
| 6,192,459 B1 | 2/2001 | Bonella et al. | |
| 6,314,497 B1 | 11/2001 | Clohset et al. | |
| 6,393,525 B1 | 5/2002 | Wilkerson et al. | |
| 6,507,893 B2 * | 1/2003 | Dawkins et al. | 711/133 |
| 6,745,295 B2 * | 6/2004 | Rodriguez | 711/136 |
| 6,748,491 B2 * | 6/2004 | Rodriguez | 711/122 |

\* cited by examiner

*Primary Examiner*—Donald Sparks
(74) *Attorney, Agent, or Firm*—Christopher K. Gagne

(57) ABSTRACT

In one embodiment, a method is provided. The method of this embodiment may include determining whether requested data is stored in a memory. If the requested data is not stored in the memory, the method may include determining whether a plurality of requests to access the requested data have occurred during a predetermined number of most recent data accesses. If the plurality of requests to access the requested data have occurred during the predetermined number of most recent data accesses, the method may also include storing the requested data in the memory. Of course, many variations, modifications, and alternatives are possible without departing from this embodiment.

22 Claims, 6 Drawing Sheets

CACHE MANAGEMENT

FIELD

This disclosure relates to the field of cache management.

BACKGROUND

The speed of access of data stored in cache memory may be significantly greater than the speed of access of data stored in disk storage. However, per unit of storage, cache memory may be more expensive than disk storage. Accordingly, in a data storage system that includes both cache memory and disk storage, the storage capacity of the cache memory may be less than the storage capacity of the disk storage. When the data storage system receives a request to access data stored in the system, the system may determine whether the request can be satisfied using data stored in the cache memory. If the request can be satisfied with data stored in the cache memory, the system may attempt to satisfy the request using the data stored in the cache memory. Conversely, if the request cannot be satisfied using the data in the cache memory, the system may satisfy the request using data stored in disk storage. A cache management technique may be utilized to manage the loading of data into, and de-staging of data from the cache memory. The cache management technique that is utilized may have a significant impact upon the system's I/O request processing speed.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
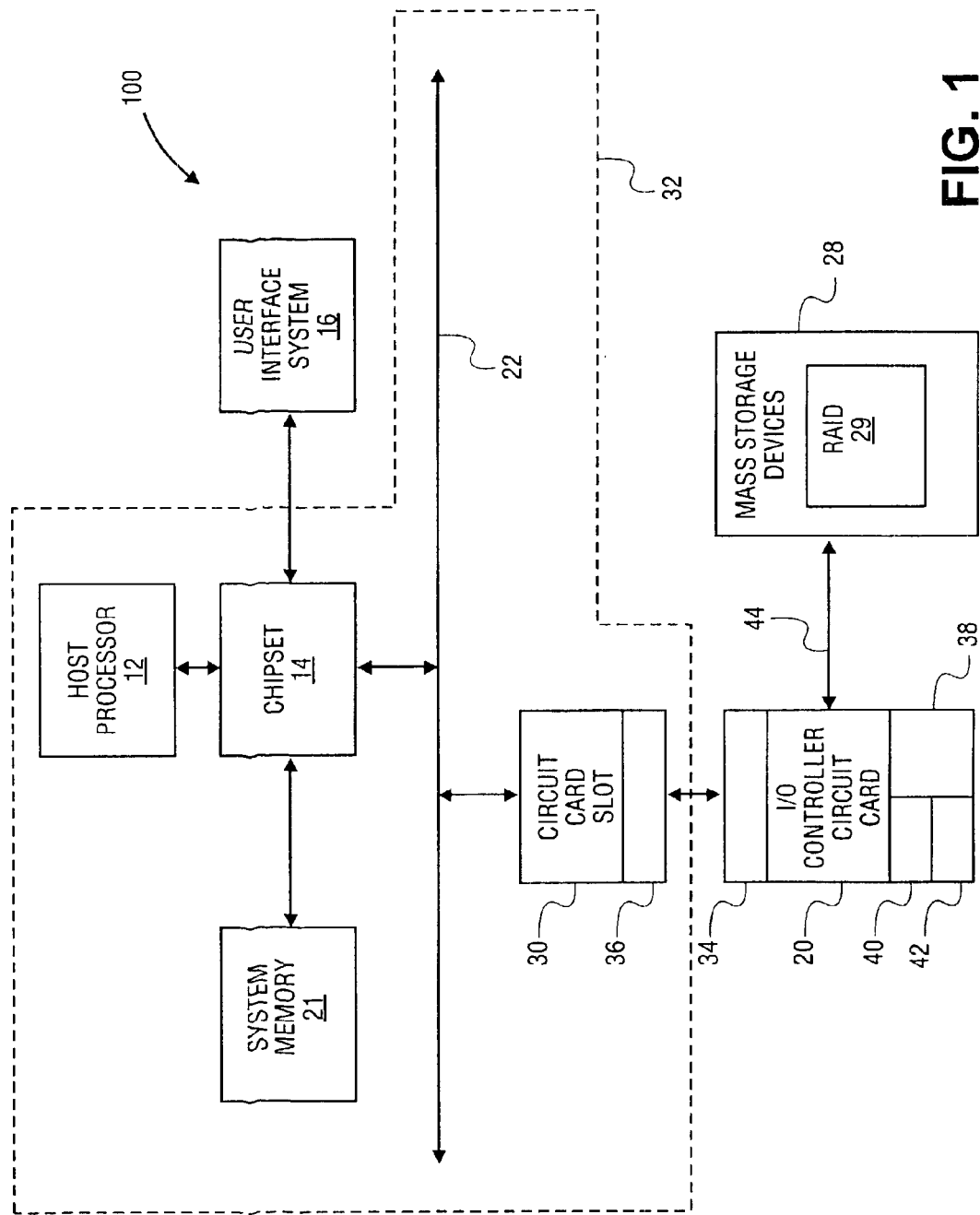
FIG. 1 is a diagram illustrating a system embodiment.

FIG. 1 illustrates a system embodiment 100 of the claimed subject matter. System 100 may include a host processor 12 coupled to a chipset 14. Host processor 12 may comprise, for example, an Intel® Pentium® III or IV microprocessor that is commercially available from the Assignee of the subject application. Of course, alternatively, host processor 12 may comprise another type of microprocessor, such as, for example, a microprocessor that is manufactured and/or commercially available from a source other than the Assignee of the subject application, without departing from this embodiment.

Chipset 14 may comprise a host bridge/hub system that may couple host processor 12, a system memory 21 and a user interface system 16 to each other and to a bus system 22. Chipset 14 may also include an I/O bridge/hub system (not shown) that may couple the host bridge/bus system to bus 22. Chipset 14 may comprise integrated circuit chips, such as those selected from integrated circuit chipsets commercially available from the assignee of the subject application (e.g., graphics memory and I/O controller hub chipsets), although other integrated circuit chips may also, or alternatively be used, without departing from this embodiment. Additionally, chipset 14 may include an interrupt controller (not shown) that may be coupled, via one or more interrupt signal lines (not shown), to other components, such as, e.g., I/O controller circuit card 20, when card 20 is inserted into circuit card bus extension slot 30. This interrupt controller may process interrupts that it may receive via these interrupt signal lines from the other components in system 100.

The operative circuitry 42 described herein as being comprised in card 20, need not be comprised in card 20, but instead, without departing from this embodiment, may be comprised in other structures, systems, and/or devices that may be, for example, comprised in motherboard 32, coupled to bus 22, and exchange data and/or commands with other components in system 100. User interface system 16 may comprise, e.g., a keyboard, pointing device, and display system that may permit a human user to input commands to, and monitor the operation of, system 100.

Bus 22 may comprise a bus that complies with the Peripheral Component Interconnect (PCI) Local Bus Specification, Revision 2.2, Dec. 18, 1998 available from the PCI Special Interest Group, Portland, Oreg., U.S.A. (hereinafter referred to as a "PCI bus"). Alternatively, bus 22 instead may comprise a bus that complies with the PCI-X Specification Rev. 1.0a, Jul. 24, 2000, available from the aforesaid PCI Special Interest Group, Portland, Oreg., U.S.A. (hereinafter referred to as a "PCI-X bus"). Also alternatively, bus 22 may comprise other types and configurations of bus systems, without departing from this embodiment.

I/O controller card 20 may be coupled to and control the operation of a set of one or more magnetic disk, optical disk, solid-state, and/or semiconductor mass storage devices (hereinafter collectively or singly referred to as "mass storage 28"). In this embodiment, mass storage 28 may comprise, e.g., one or more redundant arrays of inexpensive disk (RAID) mass storage devices 29.

Processor 12, system memory 21, chipset 14, PCI bus 22, and circuit card slot 30 may be comprised in a single circuit board, such as, for example, a system motherboard 32. Mass storage 28 may be comprised in one or more respective enclosures that may be separate from the enclosure in which the motherboard 32 and the components comprised in the motherboard 32 are enclosed. Alternatively, card 20 may be comprised in an enclosure that may contain mass storage 28.

Depending upon the particular configuration and operational characteristics of mass storage 28, I/O controller card 20 may be coupled to mass storage 28 via one or more network communication links or media 44. Card 20 may exchange data and/or commands with mass storage 28, via links 44, using any one of a variety of different communication protocols, e.g., a Small Computer Systems Interface (SCSI), Fibre Channel (FC), Ethernet, Serial Advanced Technology Attachment (S-ATA), or Transmission Control Protocol/Internet Protocol (TCP/IP) communication protocol. Of course, alternatively, I/O controller card 20 may exchange data and/or commands with mass storage 28 using other communication protocols, without departing from this embodiment of the claimed subject matter.

In accordance with this embodiment, a SCSI protocol that may be used by controller card 20 to exchange data and/or commands with mass storage 28 may comply or be compatible with the interface/protocol described in American National Standards Institute (ANSI) Small Computer Systems Interface-2 (SCSI-2) ANSI X3.131-1994 Specification. If a FC protocol is used by controller card 20 to exchange data and/or commands with mass storage 28, it may comply or be compatible with the interface/protocol described in ANSI Standard Fibre Channel (FC) Physical and Signaling Interface-3 X3.303:1998 Specification. Alternatively, if an Ethernet protocol is used by controller card 20 to exchange data and/or commands with mass storage 28, it may comply or be compatible with the protocol described in Institute of Electrical and Electronics Engineers, Inc. (IEEE) Std. 802.3, 2000 Edition, published on Oct. 20, 2000. Further, alternatively, if a S-ATA protocol is used by controller card 20 to exchange data and/or commands with mass storage 28, it may comply or be compatible with the protocol described in "Serial ATA: High Speed Serialized AT Attachment," Revision 1.0, published on Aug. 29, 2001 by the Serial ATA Working Group. Also, alternatively, if TCP/IP is used by controller card 20 to exchange data and/or commands with mass storage 28, it may comply or be compatible with the protocols described in Internet Engineering Task Force (IETF) Request For Comments (RFC) 791 and 793, published September 1981.

Circuit card slot 30 may comprise a PCI expansion slot that comprises a PCI bus connector 36. Connector 36 may be electrically and mechanically mated with a PCI bus connector 34 that is comprised in circuit card 20. Circuit card 20 also may comprise operative circuitry 42. Circuitry 42 may comprise a processor (e.g., an Intel® Pentium® III or IV microprocessor) and associated computer-readable memory (collectively and/or singly referred to hereinafter as "processor 40"). This associated computer-readable memory may comprise one or more of the following types of memories: semiconductor firmware memory, programmable memory, non-volatile memory, read only memory, electrically programmable memory, random access memory, flash memory, magnetic disk memory, and/or optical disk memory. Either additionally or alternatively, this computer-readable memory may comprise other and/or later-developed types of computer-readable memory. Also either additionally or alternatively, processor 40 may comprise another type of microprocessor, such as, for example, a microprocessor that is manufactured and/or commercially available from a source other than the Assignee of the subject application, without departing from this embodiment.

Machine-readable program instructions may be stored in the computer-readable memory associated with processor 40. These instructions may be accessed and executed by processor 40. When executed by processor 40, these instructions may result in processor 40 performing the operations described herein as being performed by processor 40.

Circuitry 42 may also comprise a cache memory 38. In this embodiment, cache memory 38 may comprise one or more semiconductor memory devices. Alternatively or additionally, cache memory 38 may comprise magnetic disk and/or optical disk memory. Processor 40 may be capable of exchanging data and/or commands with cache memory 38 that may result in cache memory 38 storing in and/or retrieving data from cache memory 38, in the manner described below.

Slot 30 and card 20 are constructed to permit card 20 to be inserted into slot 30. When card 20 is properly inserted into slot 30, connectors 34 and 36 become electrically and mechanically coupled to each other. When connectors 34 and 36 are so coupled to each other, card 20 becomes electrically coupled to bus 22.

Figure 3:
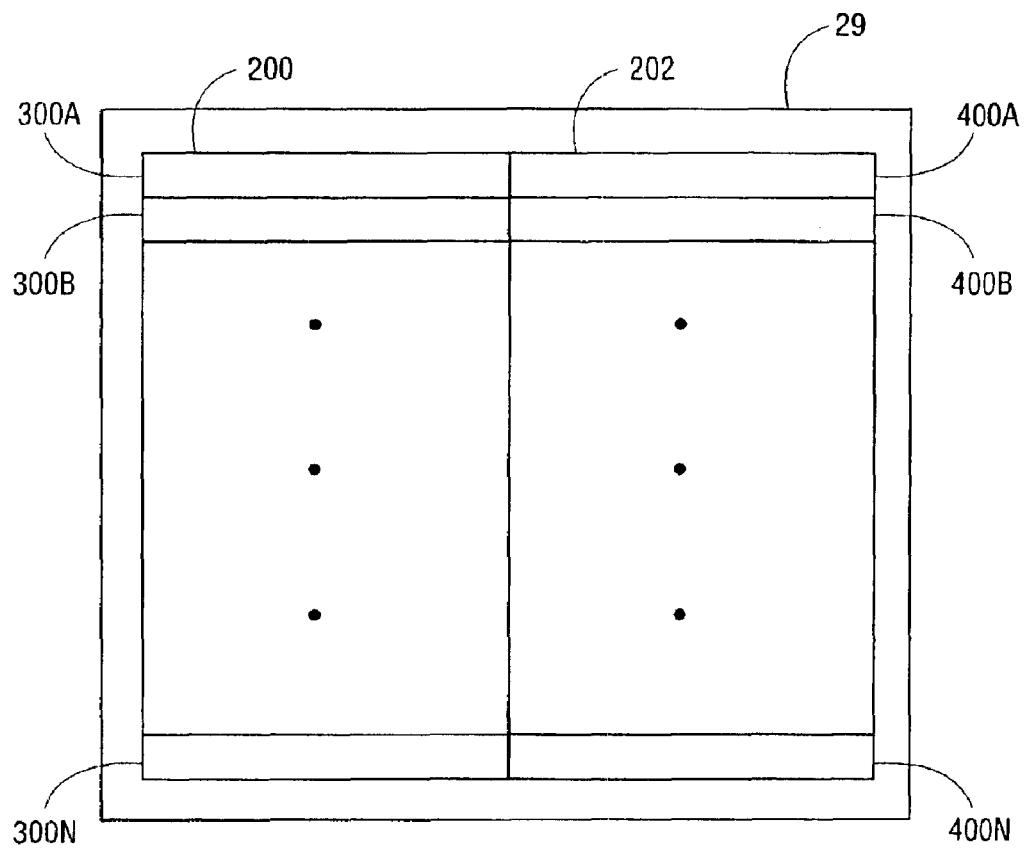
FIG. 3 is a diagram illustrating data volumes and data segments that may be stored in mass storage according to one embodiment.

As shown in FIG. 3, RAID 29 may comprise a plurality of user data volumes 200 and 202. Of course, the number of user data volumes shown in FIG. 3 is merely exemplary, and RAID 29 may comprise any number of user data volumes without departing from this embodiment. Each of the data volumes 200 and 202 may comprise a respective logical data volume that may span a respective set of physical disk devices (not shown) in mass storage 28. For example, data volume 200 may comprise a plurality of logical user data segments 300A, 300B, . . . 300N, and data volume 202 may comprise a plurality of logical data segments 400A, 400B, . . . 400N. Depending upon the particular RAID technique implemented in RAID 29, each respective logical data segment 300A, 300B, . . . 300N in volume 200 and each respective logical data segment 400A, 400B, . . . 400N in volume 202 may comprise a respective plurality of logically related physical data segments (not shown) that are distributed in multiple physical mass storage devices (not shown), and from which the respective logical data segment may be calculated and/or obtained. For example, if RAID Level 1 (i.e., mirroring) is implemented in RAID 29, each logical data segment 300A, 300B, . . . 300N in volume 200 and each logical data segment 400A, 400B, . . . 400N in volume 202 may comprise a respective pair of physical data segments (not shown) that are copies of each other and are distributed in two respective physical mass storage devices (not shown). Alternatively, other RAID techniques, including, for example, parity RAID techniques may be implemented in RAID 29 without departing from this embodiment. Each of the logical data segments in RAID 29 may have a predetermined size, such as, for example, 16 or 32 kilobytes (KB). Each of the logical data segments in RAID 29B may have a predetermined size, such as, for example, 16 or 32 kilobytes (KB). Alternatively, or additionally, each of the logical data segments in RAID 29B may have predetermined size that corresponds to a predetermined number of disk stripes. Of course, the number and size of the logical data segments in RAID 29B may differ without departing from this embodiment.

The operations that may implement the RAID technique implemented in RAID 29 may be carried out by RAID circuitry (not shown) that may be comprised in, e.g., motherboard 32, mass storage 28 and/or RAID 29. Alternatively, card 20 may comprise such RAID circuitry. Processor 40 may exchange data and/or commands with such RAID circuitry that may result in data segments being written to and/or read from RAID 29 in accordance with the RAID technique implemented by RAID 29. Alternatively, processor 40 may be programmed to emulate operation of such RAID circuitry, and may exchange data and/or commands with mass storage 28 that may result in RAID 29 being implemented in mass storage 28. Further alternatively, host processor 12 may be programmed to emulate operation of such RAID circuitry, and may exchange data and/or commands with mass storage 28 and/or processor 40 that may result in RAID 29 being implemented in mass storage 28.

Figure 2:
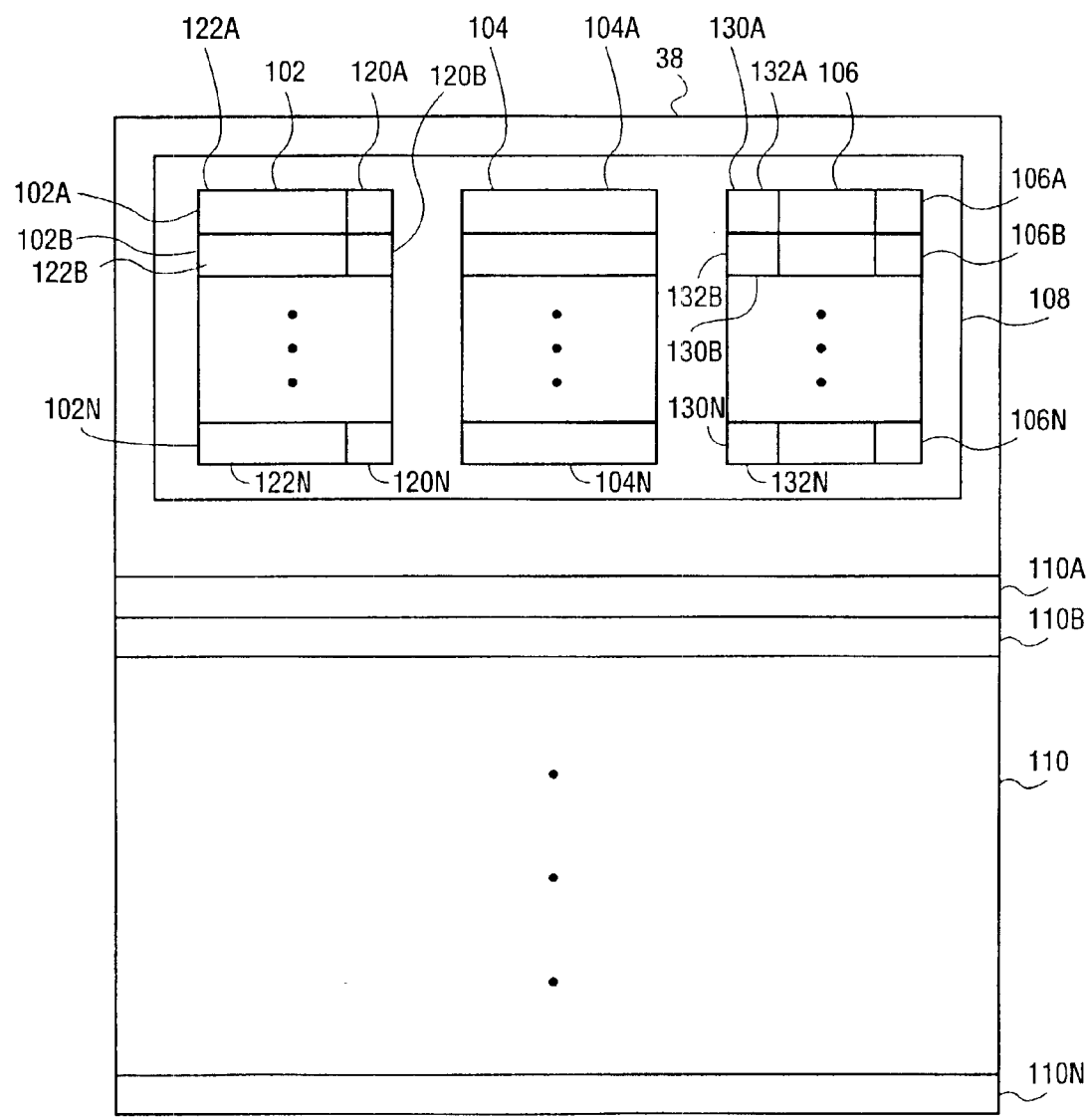
FIG. 2 is a diagram illustrating cache management information and user data that may be stored in cache memory according to one embodiment.

With reference now being made to FIG. 2, in accordance with this embodiment, processor 40 may signal cache memory 38 to store in cache memory 38 cache management data information 108 and user data 110. For reasons that are explained below, cache management information 108 may include a plurality of data structures that contain information that may be used to implement a cache management technique in accordance with one embodiment. The data structures comprised in cache management information 108 may include, for example, doubly-linked list 102, bit map array 104, and hash table 106. User data 110 may comprise one or more (and in this embodiment, a plurality of) data segments 110A, 110B, ... 110N.

Doubly-linked list 102 may comprise a plurality of linked list nodes 102A, 102B, ... 102N. In linked list 102, one of these nodes (e.g., node 102A) may be a head node, and another of these nodes (e.g., node 102N) may be tail node. Each respective node in linked list 102, other than tail node 102N, may include a pointer to the next succeeding node in linked list 102 relative to that respective entry, toward tail node 102N. For example, head node 102A may include a pointer 120A that points to a next succeeding node 102B relative to head node 102A toward tail node 102N. Node 102B may include a pointer 120B that points to a next succeeding node (not shown) relative to node 102B toward tail node 102N, and so forth. Tail node 102N may include a null pointer 120N. Additionally, each respective node in linked list 102, other than head node 102A, may include a pointer (not shown) to the last preceding node in linked list 102. For reasons that are described below, each node 102A, 102B, ... 102N may also contain a respective starting address and/or block identification number 122A, 122B, ... 122N of a respective logical data segment in RAID 29. In one embodiment, the maximum number of nodes comprised in linked list 102 may be equal to about 30,000, but may vary without departing from this embodiment.

Bit map array 104 contains a plurality of entries 104A, 104B, ... 104N. The number of entries 104A, 104B, ... 104N may be equal to the number of logical data segments 300A, 300B, ... 300N and 400A, 400B, ... 400N comprised in RAID 29. Each entry 104A, 104B, ... 104N in array 104 may be associated with a respective one of the logical data segments 300A, 300B, ... 300N and 400A, 400B, ... 400N comprised in RAID 29. Each entry 104A, 104B, ... 104N in array 104 may contain a single respective bit value that may be either set or cleared. As used herein, a bit value is considered to be set when it is equal to a value that indicates a first Boolean logical condition (e.g., True), and conversely, a bit value is considered to be cleared when it is equal to a value that indicates a second Boolean logical condition (e.g., False) that is opposite to the first Boolean logical condition.

Hash table 106 comprises a doubly-linked list hash table that may contain information that identifies, among other things, user data segments 110A, 110B, ... 110N in cache memory 38, and the order in which data segments 110A, 110B, ... 110N have been accessed. Hash table 106 may also contain information that specifies, for each data segment 110A, 110B, ... 110N in cache memory 38, whether the data segment is considered "dirty" or "clean." As used herein, a data segment in cache memory 38 is considered to be "dirty," if, when the data segment is to be de-staged from cache memory 38, RAID 29 does not contain a corresponding data segment that is identical to the data segment that is being de-staged from cache memory 38. Conversely, as used herein, a data segment in cache memory 38 is considered to be "clean," if, when the data segment is to be de-staged from cache memory 38, RAID 29 already stores a corresponding data segment that is identical to the data segment that is being de-staged from cache memory 38.

More specifically, doubly-linked list hash table 106 may comprise an array of pointers 106A, 106B, ... 106N that point to respective head nodes 132A, 132B, ... 132N of respective doubly-linked lists 130A, 130B, ... 130N. Each node in the doubly-linked lists 130A, 130B, ... 130N may represent a respective data segment stored in cache 38. Each such node may be associated with and may be included in a given one of the linked lists 130A, 130B, ... 130N based upon and/or in accordance with a conventional hashing function that may map starting addresses or data block identification numbers in RAID 29 of the data segments stored in cache memory 38 to indices into the array of pointers.

Figure 5:
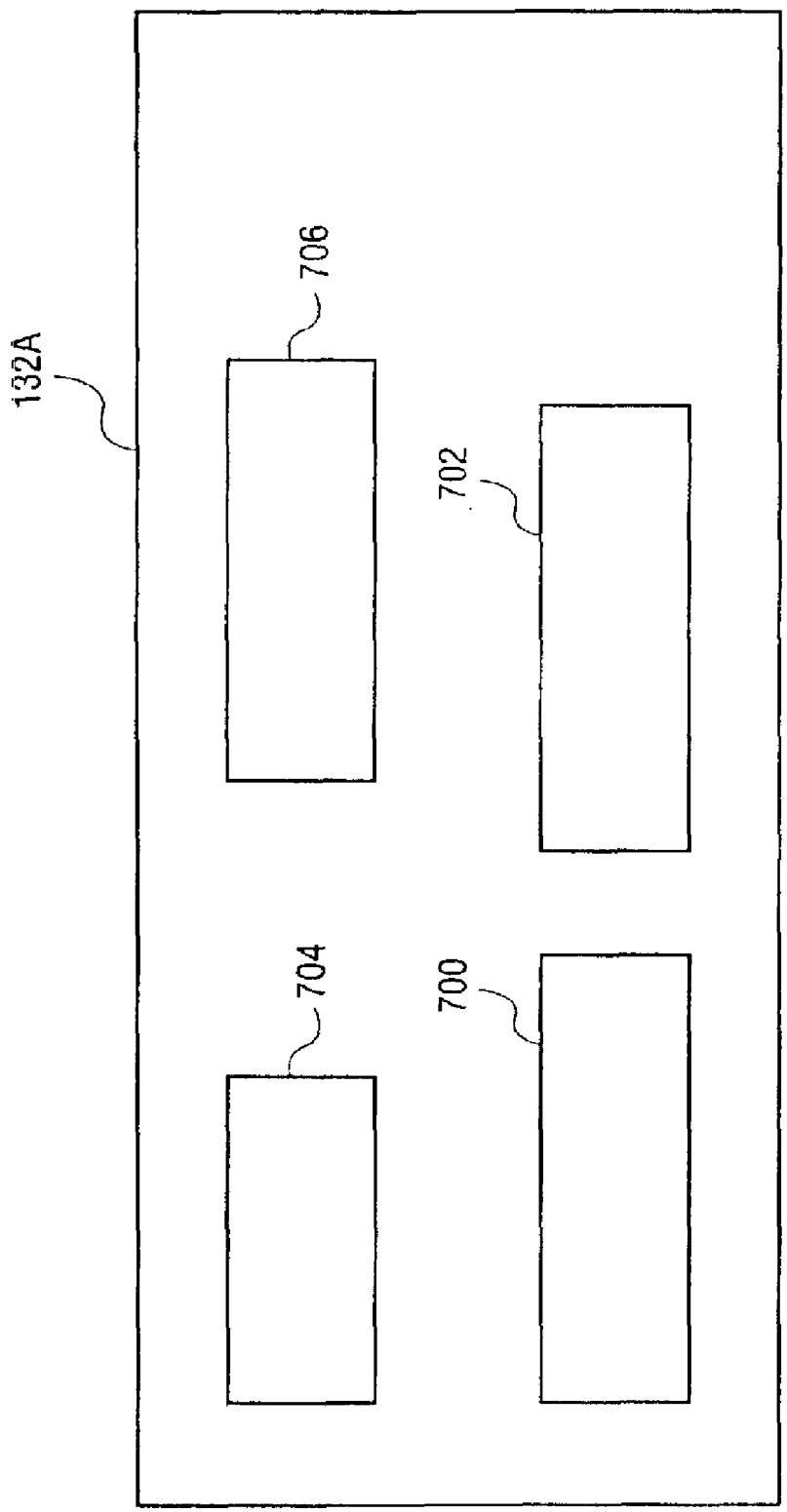
FIG. 5 is a diagram illustrating data structures that may be comprised in a node in a linked list in cache memory according to one embodiment.
Figure 6:
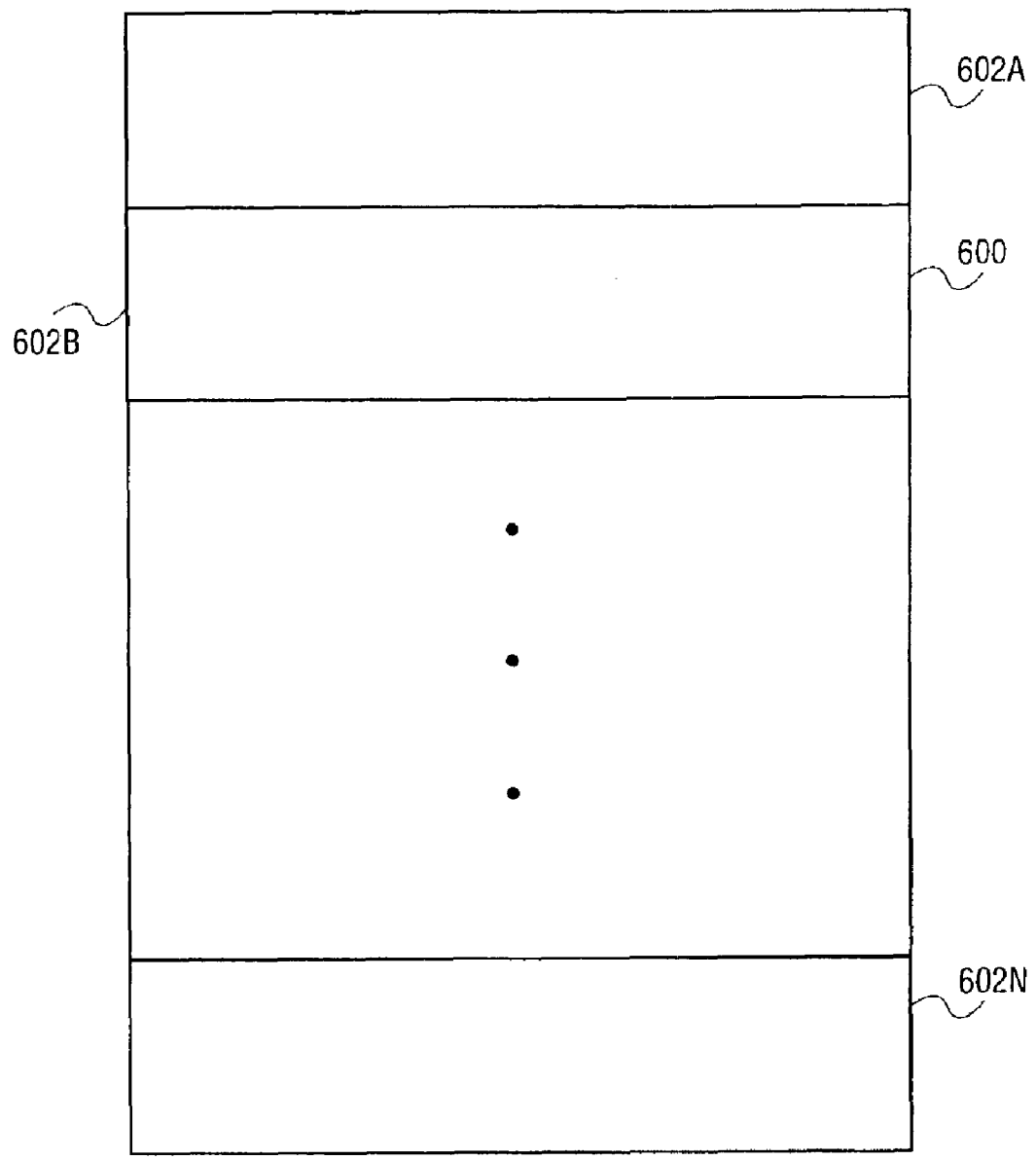
FIG. 6 is a diagram illustrating a linked list that may be comprised in cache memory according to one embodiment.

FIG. 5 is a diagram of an exemplary node 132A that may be comprised in one of the linked lists 130A. Each of the nodes comprised in linked lists 130A, 130B, ... 130N may have a structure that is identical to node 132A. As shown in FIG. 5, node 132A may include a pointer 700 that points to a next succeeding node (not shown) in linked list 130A that may comprise node 132A. Of course, if node 132A is the tail node of linked list 130A, pointer 700 may be a null pointer. Additionally, although not shown in the Figures, each respective node comprised in linked links 130A, 130B, ... 130N, unless the respective node is a head node, may include a pointer (not shown) that points to a last preceding node in the linked list that comprises that respective node. Node 132A may also include one or more data values 702 that may specify and/or indicate a beginning address of the data segment stored in cache memory 38 that is being represented by node 132A and a starting address and/or data block identification number of the logical data segment in volumes 200 and 202 that corresponds to the data segment in cache memory 38. Node 132A may also include a bit value 704 that indicates whether this data segment is clean or dirty. Additionally, node 132A may include a pointer 706 to a next node 602B in another doubly-linked list 600, shown in FIG. 6. That is, all of the nodes in linked lists 130A, 130B, ... 130N may also be comprised in doubly-linked list 600. The respective order of the nodes comprised in linked list 600, from head node 602A to tail node 602N, may indicate the order of access of the data segments represented by these nodes in linked list 600. Thus, for example, head node 602A may represent the most recently used (MRU) data segment in cache memory 38, and tail node 602N may represent the least recently used (LRU) data segment in cache memory 38.

Figure 4:
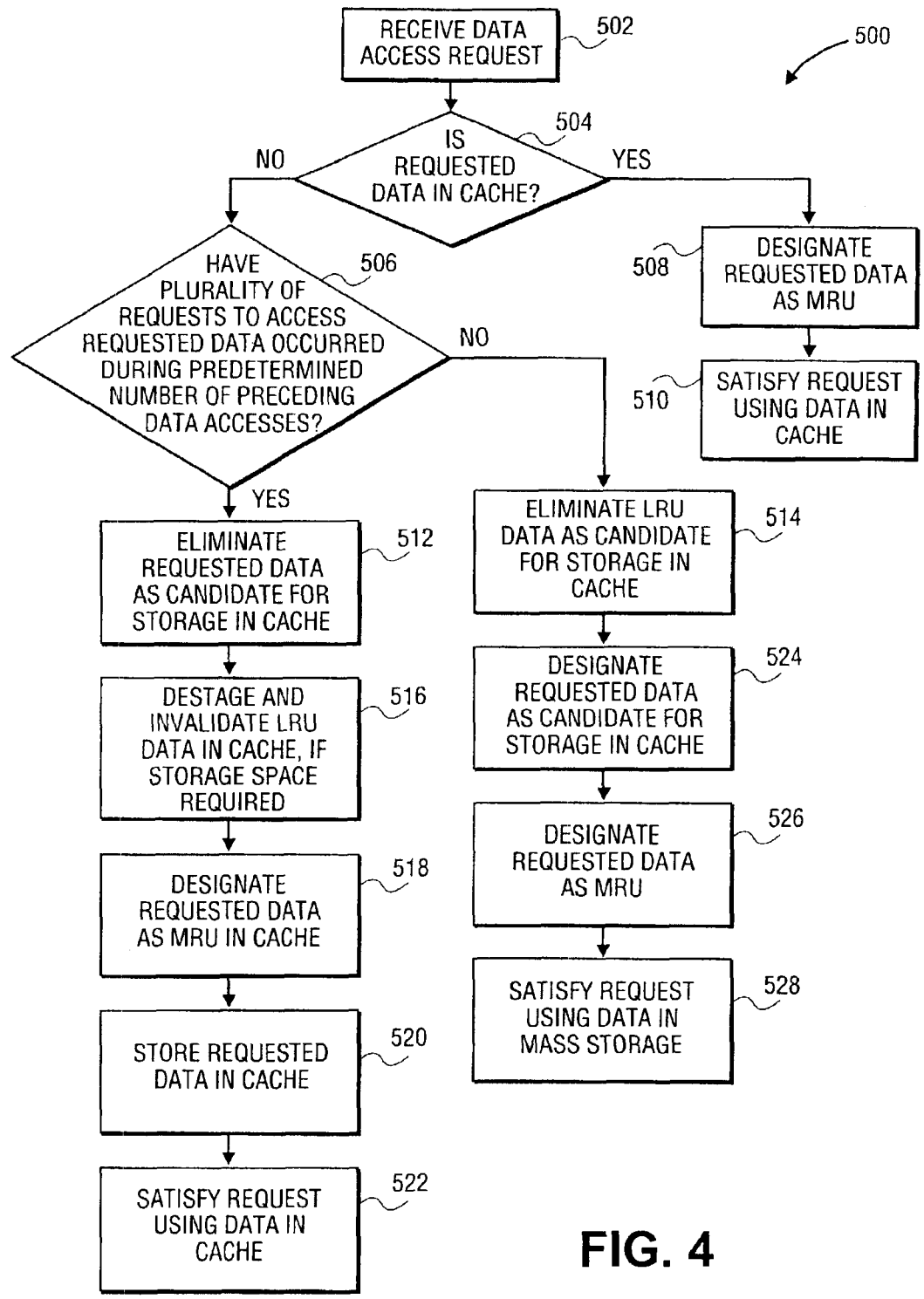
FIG. 4 is a flowchart illustrating operations that may be performed in the system of FIG. 1 according to one embodiment.

Firmware program instructions executed by processor 40 may result in, among other things, card 20 issuing appropriate control signals to cache memory 38 that may permit operations involved in a cache management technique according to one embodiment to be implemented in system 100. FIG. 4 is a flowchart that illustrates these and other operations 500 that may be carried out in system 100, in accordance with one embodiment.

In response to, for example, receiving from host processor 12 a request to access data stored in RAID 29, such as operation 502 in FIG. 4, processor 40 in card 20 may execute one or more firmware subroutines and/or procedures. As used herein, a "request to access data" may comprise a request to write or to read data. For example, host processor 12 may issue to processor 40 a request to access a data segment (e.g., data segment 300A) comprised in volumes 200 and 202. When executed by processor 40, these one or more firmware subroutines and/or procedures may result in processor 40 determining whether requested data segment 300A is currently stored in cache memory 38, as illustrated by operation 504 in FIG. 4. Processor 40 may determine this based, at least in part, upon the contents of hash table 106. More specifically, using the hashing function associated with hash table 106, processor 40 may generate a hash table key based, at least in part, upon the starting address or data block identification number of requested data segment 300A. Processor 40 may use this hash table key as an index into array of pointers 106A, 106B, . . . 106N. If a pointer (e.g., pointer 106A) in array of pointers 106A, 106B, . . . 106N is indexed by the hash table key, processor 40 may search through the one or more nodes that may be comprised in the linked list (e.g., linked list 130A) whose head node (e.g., head node 132A) is pointed to by that selected pointer 106A, to try to find a node in that linked list 130A that may represent requested data segment 300A. If such a node exists in linked list 130A, processor 40 may determine that requested data segment 300A is stored in cache memory 38 (i.e., that a data segment, such as, for example, data segment 110A may be stored in cache memory 38 that may correspond to requested data segment 300A).

If processor 40 determines that requested data segment 300A is stored in cache memory 38 (e.g., as corresponding data segment 110A), processor 40 may signal cache memory 38. This may result in data segment 110A (and its corresponding data segment 300A) being designated as the MRU data segment in cache memory 38, as illustrated by operation 508 in FIG. 4. Processor 40 may accomplish this by examining the order of the nodes in linked list 600, and if node 132A that represents data segment 10A is not head node 602A of linked list 600, processor 40 may modify one or more pointers 706 in nodes 132A, 132B, . . . 132N such that node 132A becomes head node 602A. Processor 40 then may satisfy the data access request received from host processor 12 using data segment 110A in cache memory 38, as illustrated by operation 510 in FIG. 4. That is, depending upon whether the data access request received from host processor 12 requests a read or write operation, processor 40 may signal cache memory 38 to perform a read of data segment 110A and may forward the data read from segment 110A to processor 12, or processor 40 may signal cache memory 38 to perform a write to data segment 110A.

Conversely, if, as a result of operation 504, processor 40 determines that requested data segment 300A is not stored in cache memory 38, processor 40 may determine whether a predetermined plurality of requests to access requested data segment 300A have occurred during a predetermined number of most recently preceding accesses of data requested by host processor 12, as illustrated by operation 506 in FIG. 4. Processor 40 may make the determination illustrated by operation 506 based, at least in part, upon examination of bit map array 104. More specifically, as stated previously, cache memory 38 may store bit map array 104 that contains entries 104A, 104B, . . . 104N. Each entry 104A, 104B, . . . 104N may be associated with a respective data segment 300A, 300B, . . . 300N, 400A, 400B, . . . 400N comprised in RAID 29. If the value of a given entry (e.g., entry 104A) is set, this indicates that processor 40 has designated the data segment (e.g., data segment 300A) in RAID 29 that is associated with given entry 104A as being a possible candidate for storage in user data portion 110 of cache memory 38. Processor 40 may signal cache memory 38 to set the value of given entry 104A if data segment 300A associated with given entry 104A has been accessed a predetermined number N of times during a predetermined number M of the most recently preceding accesses of data requested by host processor 12. The values of N and M may be selected empirically, based upon the performance of system 100 that may result from the values of N and M selected, so as to permit system 100 to exhibit a desired level of performance. In this embodiment, N may be greater than or equal to 1, and M may be equal to about 30,000. In the following description the values of N and M are 1 and 30,000, respectively. That is, the value of entry 104A may be set if the data segment 300A associated with entry 104A has been accessed once during the most recently preceding 30,000 data access requests issued by host processor 12. Alternatively, the values of N and M may vary without departing from this embodiment. For example, N may be greater than or equal to 2 or 3, without departing from this embodiment.

In this embodiment, if N+1 requests to access requested data segment 300A have occurred during the last M+1 preceding accesses of data requested by host processor 12, processor 40 may determine, as a result of operation 506, that the predetermined plurality of requests to access requested data segment 300A have occurred during the predetermined number of most recently preceding accesses of data requested by host processor 12. Conversely, if N+1 requests to access requested data segment 300A have not occurred during the last M+1 preceding accesses of data requested by host processor 12, processor 40 may determine, as a result of operation 506, that the predetermined plurality of requests to access requested data segment 300A have not occurred during the predetermined number of most recently preceding accesses of data requested by host processor 12. Thus, when processor 40 examines entry 104A after receiving, as a result of operation 502, the most recent request from host processor 12 to access data segment 300A, if the value of entry 104A is set, processor 40 may determine, as a result of operation 506, that the predetermined plurality of requests to access requested data segment 300A have occurred during the predetermined number of most recently preceding accesses of data requested by host processor 12. Conversely, when processor 40 examines entry 104A after receiving, as a result of operation 502, the most recent request from host processor 12 to access data segment 300A, if the value of entry 104A is not set, processor 40 may determine, as a result of operation 506, that the predetermined plurality of requests to access requested data segment 300A have not occurred during the predetermined number of most recently preceding accesses of data requested by host processor 12.

If, as a result of operation 506, processor 40 determines that the predetermined plurality of requests to access requested data segment 300A have occurred during the predetermined number of most recently preceding accesses of data requested by host processor 12, processor 40 may eliminate requested data segment 300A as a candidate for storage in cache memory 38, as illustrated by operation 512 in FIG. 4. Processor 40 may accomplish this by signaling cache memory 38. This may result in cache memory 38 clearing the value in entry 104A. After the value in entry 104A has been cleared as a result of operation 512, processor 40 may de-stage and invalidate the LRU user data segment presently stored in cache memory 38, if the LRU user data segment presently stored in cache memory 38 must be overwritten in order to be able to store requested data segment 300A in cache memory 38. For example, if data segment 110N is the LRU user data segment presently stored in cache memory 38, data segment 110N may be represented by tail node 602N in linked list 600. Processor 40 may locate tail node 602N and may examine tail node 602N to determine that data segment 110N is represented by tail node 602N. Thereafter, processor 40 may signal cache memory 38 and mass storage 28. This may result in the de-staging of data segment 110N to RAID 29, and may also result in the overwriting of one or more values (not shown) in tail node 602N to indicate that data segment 110N is now available to be overwritten. Alternatively, if sufficient storage space exists in cache memory 38 to store requested data segment 300A in cache memory 38 without overwriting LRU data segment 110N, operation 516 may not be performed in system 100. In either case, processor 40 may signal cache memory 38 to designate requested data segment 300A as the MRU data segment in cache memory 38, and to store data segment 300A in cache memory 38 (e.g., as a corresponding data segment 110N that is a copy of data segment 300A), as illustrated by operations 518 and 520, respectively, in FIG. 4. More specifically, processor 40 may signal cache memory 38 to include in hash table 106 a new node that represents requested data segment 300A (and its corresponding data segment 110N in cache memory 38). This may result in cache memory 38 inserting in hash table 106 a new node at the beginning of linked list 600 (i.e., as a new head node 602A) that represents requested data segment 300A (and its corresponding data segment 110N), and also may result in modification of one or more pointers 706 in nodes 132A, 132B, . . . 132N that were previously present in linked list 600 such that this new node becomes head node 602A. This may result in the designation of data segment 300A (and its corresponding data segment 110N) as the MRU data segment in cache memory 38.

After requested data segment 300A has been stored in cache memory 38 as result of operation 520, processor 40 then may satisfy the data access request received from host processor 12 using data segment 110N in cache memory 38 that contains a copy of requested data segment 300A, as illustrated by operation 522 in FIG. 4. That is, depending upon whether the data access request received from host processor 12 requests a read or write operation, processor 40 may signal cache memory 38 to perform a read of data segment 110N and may forward the data read from segment 110N to processor 12, or processor 40 may signal cache memory 38 to perform a write to data segment 110N.

Conversely, if as a result of operation 506, processor 40 determines that the predetermined plurality of requests to access requested data segment 300A have not occurred during the predetermined number of most recently preceding accesses of data requested by host processor 12, processor 40 may eliminate, as a candidate for storage in cache memory 38, the LRU data segment that is currently designated as a candidate for storage in cache memory 38, as illustrated by operation 514 in FIG. 4. More specifically, as stated previously, linked list 102 may comprise a plurality of linked list nodes 102A, 102B, . . . 102N, with node 102A being the head node and node 102N being the tail node, respectively. In this embodiment, the maximum number of nodes that may be comprised in linked list 102 may be predetermined and may be equal to M. Each node 102A, 102B . . . 102N that may be comprised in linked list 102 may represent a respective logical data segment in RAID 29 that is currently designated as a candidate for storage in cache memory 38. That is, each respective node 102A, 102B, . . . 102N in linked list 102 may include one or more respective values, such as, for example, starting addresses and/or block identification numbers 122A, 122B, . . . 122N that may indicate and/or specify the respective logical data segment in RAID 29 that is being represented by that respective node. The respective order of the nodes comprised in linked list 102, from head node 102A to tail node 102N, may indicate the order of access of the data segments represented by these nodes in linked list 102. Thus, for example, head node 102A may represent the MRU data segment that is a candidate for storage in cache memory 38, and tail node 102N may represent the LRU data segment that is a candidate for storage in cache memory 38. In operation 514, if the number of nodes in linked list 102 is equal to the predetermined maximum number, processor 40 may signal cache memory 38 to eliminate tail node 102N from linked list 102. This may result in elimination of the LRU data segment represented by tail node 102N as a candidate for storage in cache memory 38. Thereafter, processor 40 may signal cache memory 38 to change the value of entry 104A in array 104 to designate requested data segment 300A as a candidate for storage in cache memory 38, as illustrated by operation 524 in FIG. 4. Processor 40 may insert, as the new head node of linked list 102, a new node that may represent the requested data segment 300A, and may also modify pointers 120A, 120B, . . . 120N such that this new node becomes head node 102A. This may result in the designation of data segment 300A as the MRU data segment that is a candidate for storage in cache memory 38, as illustrated by operation 526 in FIG. 4. Processor 40 then may satisfy the data access request from host processor 12 using data segment 300A stored in RAID 29, as illustrated by operation 528 in FIG. 4.

Although not shown in the Figures, in addition to operations 500, operations may be performed in system 100. For example, such additional operations may detect one or more requests to access sequential data segments, in the manner described in, for example, co-pending U.S. patent application Ser. No. 10/028,065, entitled "Sequential Data Transfer Detection," filed Dec. 21, 2001. This co-pending U.S. Patent Application is assigned to the Assignee of the subject application. In system 100, sequential data segments that are requested by such access requests may be stored in cache memory 38 regardless of whether they have been previously designated as candidates for storage in cache memory 38. After all of the data segments requested by such access requests have been stored in cache memory 38, they may be de-staged to mass storage 28 and designated as in hash table 106 as LRU data segments in cache memory 38.

Additionally, a portion (not shown) of cache memory 38 may be designated for use in write buffering operations involving one or more data segments. In such write buffering operations, one or more data segments being written to mass storage 28 may first be written to cache memory 38. After the data segments have been written to cache memory 38, processor 40 may indicate to host processor 12 that they have been written into mass storage 28, even though, in actuality they have not yet been written into mass storage 28. Thereafter, processor 40 may signal cache memory 38 to de-stage these data segments to mass storage 28.

Also, the data structures described herein as being comprised in cache management information 108 are merely exemplary, and other and/or additional data structures may be comprised in cache management information 108 without departing from this embodiment. For example, in order to consume less storage space in cache memory 38, instead of using bit map array 104 to designate data segments in RAID 29 that may be candidates for storage in cache memory 38, cache management information 108 alternatively may use a hash table having nodes that may be used to represent such data segments.

Also alternatively, the respective number of bits in each entry 104A, 104B, . . . 104N in bitmap 104 may be greater than one. In this alternative arrangement, the respective value of contained in each respective entry 104A, 104B, . . . 104N may be initialized (e.g., after a reset of system 100) to be equal to a predetermined value. Thereafter, each time a respective data segment in RAID 29 is accessed, the respective value contained in the respective entry in bitmap 104 that corresponds to that respective data segment may be decremented (or alternatively, incremented). Thereafter, if the respective value contained in the respective entry in bitmap 104 becomes equal to another predetermined value within a predetermined number of the most recent accesses of data segments in RAID 29, this may result in the respective data segment in RAID 29 that corresponds to that respective entry being copied into cache memory 38.

Additionally, circuitry 42, motherboard 32, and/or mass storage 28 may comprise one or more backup and/or secondary power supply systems (not shown) that may supply actuating electrical power to circuitry 42, motherboard 32, and/or mass storage 28 in the event of loss and/or failure of primary actuating power to circuitry 42, motherboard 32, and/or mass storage 28. These one or more backup and/or secondary power supply systems may comprise one or more batteries from which actuating electrical power may be supplied to circuitry 42, motherboard 32, and/or mass storage 28 in the event of such loss and/or failure, in order to permit circuitry 42, motherboard 32, and/or mass storage 28 to continue to operate, at least temporarily, and thereby prevent loss and/or corruption of data in system 100.

Also, without departing from this embodiment, at least a portion of data segments 110 and/or cache management information 108 may be stored in one or more other (not shown) cache memories other than cache memory 38. These one or more other cache memories may be located, for example, in card 20, motherboard 32, mass storage 28, and/or RAID 29. The operation of these one or more cache memories may be controlled by host processor 12, processor 40, and/or one or more other processors (not shown) located in e.g., card 20, mass storage 28 and/or RAID 29. Furthermore, at least a portion of cache management information 108 may be stored in a different cache memory from the cache memory in which at least a portion of data segments 110 is stored.

Thus, in summary, in one system embodiment, a circuit card is provided that is capable of being coupled to the one or more mass storage devices. The circuit card may include cache memory and circuitry. The circuitry may be capable of determining whether requested data is stored in the cache memory. The circuitry may also be capable of determining, if the requested data is not stored in the cache memory, whether a plurality of requests to access the requested data have occurred during a predetermined number of most recent data accesses. Additionally, the circuitry may be capable of storing, if the plurality of requests to access the requested data have occurred during the predetermined number of most recent data accesses, the requested data in the cache memory. Advantageously, this system embodiment may implement an efficient cache management technique that may improve the speed with which the system embodiment may process requests to access data. More specifically, in this system embodiment, a requested data segment may be stored in cache memory only after there have been a predetermined plurality of previous requests to access the data segment, within a predetermined number of most recently occurring data access requests. If such a predetermined plurality of previous requests have occurred within the predetermined number of most recently occurring data access requests, this may indicate that it is likely that access to the request data segment will take place soon. Thus, by implementing this cache memory management technique, it may be possible to improve the efficiency and speed of processing data access requests, since in this system embodiment, the requested data segment may be stored in cache memory only when it is likely that access to that data segment will occur again soon.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method comprising:

determining whether requested data is stored in a memory;

if the requested data is not stored in the memory, determining whether a plurality of requests to access the requested data have occurred during a predetermined number of most recent data accesses;

if the plurality of requests to access the requested data have occurred during the predetermined number of most recent data accesses, storing the requested data in the memory;

if fewer than the plurality of requests to access the requested data have occurred during the predetermined number of most recent data accesses:
designating the requested data as a possible candidate for storage in the memory; and
satisfying, at least in part, a most recent request to access the requested data by accessing at least one data segment in mass storage.

2. The method of claim 1, further comprising:

if the plurality of requests to access the requested data have occurred during the predetermined number of most recent data accesses, de-staging least recently used data from the memory.

3. The method of claim 1, further comprising:

if the plurality of requests to access the requested data have occurred during the predetermined number of most recent data accesses, designating the requested data as most recently used data in the memory.

4. The method of claim 1, further comprising:

designating the at least one data segment as a most recently used data segment in the mass storage; and canceling a previous designation of another data segment in the mass storage as being a possible candidate for storage in the memory, the another data segment being a previously accessed data segment in the mass storage.

5. The method of claim 1, wherein:

the predetermined number of most recent data accesses comprises two or more of the most recent data accesses.

6. The method of claim 1, wherein:

the requested data comprises at least one data segment; and each of the requests to access the requested data requests one of a read of and write to the requested data.

7. An apparatus comprising:

circuitry to determine whether requested data is stored in a memory and to determine, if the requested data is not stored in the memory, whether a plurality of requests to access the requested data have occurred during a predetermined number of most recent data accesses, the circuitry also being capable of storing, if the plurality of requests to access the requested data have occurred during the predetermined number of most recent data accesses, the requested data in the memory, and if fewer than the plurality of requests to access the requested data have occurred during the predetermined number of most recent data accesses, the circuitry is also capable of:
designating the requested data as a possible candidate for storage in the memory; and satisfying, at least in part, a most recent request to access the requested data by accessing at least one data segment in mass storage.

8. The apparatus of claim 7, wherein:
if the plurality of requests to access the requested data have occurred during the predetermined number of most recent darn accesses, the circuitry is also capable of de-staging least recently used data from the memory.

9. The apparatus of claim 7, wherein:
if the plurality of requests to access the requested data have occurred during the predetermined number of most recent data accesses, the circuitry is also capable of designating the requested data as most recently used data in the memory.

10. The apparatus of claim 7, wherein the circuitry is also capable of:
designating the at least one data segment as a most recently used data segment in the mass storage; and
canceling a previous designation of another data segment in the mass storage as being a possible candidate for storage in the memory, the another data segment being a previously accessed data segment in the mass storage.

11. The apparatus of claim 7, wherein:
the plurality of requests to access the requested data comprises three or more of the most recent data accesses.

12. The apparatus of claim 7, wherein:
the requested data comprises at least one data segment; and
each of the requests to access the requested data requests one of a read of and write to the requested data.

13. An article comprising:
a storage medium having stored thereon instructions that when executed by a machine result in the following:
determining whether requested data is stored in a memory;
if the requested data is not stored in the memory, determining whether a plurality of requests to access the requested data have occurred during a predetermined number of most recent data accesses;
if the plurality of requests to access the requested data have occurred during the predetermined number of most recent data accesses, storing the requested data in the memory;
if fewer than the plurality of requests to access the requested data have occurred during the predetermined number of most recent data accesses, the instructions when executed by the machine also result in:
designating the requested data as a possible candidate for storage in the memory; and
satisfying, at least in part, a most recent request to access the requested data by accessing at least one data segment in mass storage.

14. The article of claim 13, wherein:
if the plurality of requests to access the requested data have occurred during the predetermined number of most recent data accesses, the instructions when executed by the machine also result in de-staging least recently used data from the memory.

15. The article of claim 13, wherein:
if the plurality of requests to access the requested data have occurred during the predetermined number of most recent data accesses, the instructions when executed by the machine also result in designating the requested data as most recently used data in the memory.

16. The article of claim 13, wherein:
the instructions when executed by the machine also result in:
designating the at least one data segment as a most recently used data segment in the mass storage; and
canceling a previous designation of another data segment in the mass storage as being a possible candidate for storage in the memory, the another data segment being a previously accessed data segment in the mass storage.

17. The article of claim 13, wherein:
the predetermined number of most recent data accesses comprises two or more of the most recent data accesses.

18. The article of claim 13, wherein:
the requested data comprises at least one data segment; and
each of the requests to access the requested data requests one of a read of and write to the requested data.

19. A system comprising:
one or more mass storage devices;
a circuit card capable of being coupled to the one or more mass storage devices, the circuit card including cache memory and circuitry, the circuitry being capable of:
determining whether requested data is stored in the cache memory;
determining, if the requested data is not stored in the cache memory, whether a plurality of requests to access the requested data have occurred during a predetermined number of most recent data accesses;
storing, if the plurality of requests to access the requested data have occurred during the predetermined number of most recent data accesses, the requested data in the cache memory;
if fewer than the plurality of requests to access the requested data have occurred during the predetermined number of most recent data accesses, the circuitry is also capable of:
designating the requested data as a possible candidate for storage in the memory; and
satisfying, at least in part, a most recent request to access the requested data by accessing at least one data segment in mass storage.

20. The system of claim 19, wherein:
the one or more mass storage devices comprise a redundant array of inexpensive disks; and
the circuitry comprises a processor.

21. The system of claim 19, wherein:
the one or more mass storage devices are capable of storing a plurality of data volumes;
each of the data volumes includes one or more data segments;
the requested data comprises at least one data segment; and
the circuitry is capable of retrieving the at least one data segment from the one or more mass storage devices and of storing the at least one data segment in the cache memory.

22. The system of claim 19, further comprising:
one or more network communication links to couple the one or more mass storage devices to the circuit card; and
a circuit board that comprises a bus, the circuit card being capable of being coupled to the bus.

* * * * *

UNITED STATES PATENT AND TRADEMARK OFFICE
CERTIFICATE OF CORRECTION

PATENT NO. : 6,918,020 B2
DATED : July 12, 2005
INVENTOR(S) : Cavallo et al.

It is certified that error appears in the above-identified patent and that said Letters Patent is hereby corrected as shown below:

Column 7,
Line 32, delete "10A" and insert -- 110A --.

Signed and Sealed this

Sixteenth Day of May, 2006

JON W. DUDAS
*Director of the United States Patent and Trademark Office*